Nov. 10, 1959  L. W. WOOLFOLK  2,912,143
DISPENSING MACHINE

Filed Sept. 2, 1958  4 Sheets-Sheet 1

INVENTOR.
LOUIS W. WOOLFOLK
BY Marin Moody
ATTORNEY

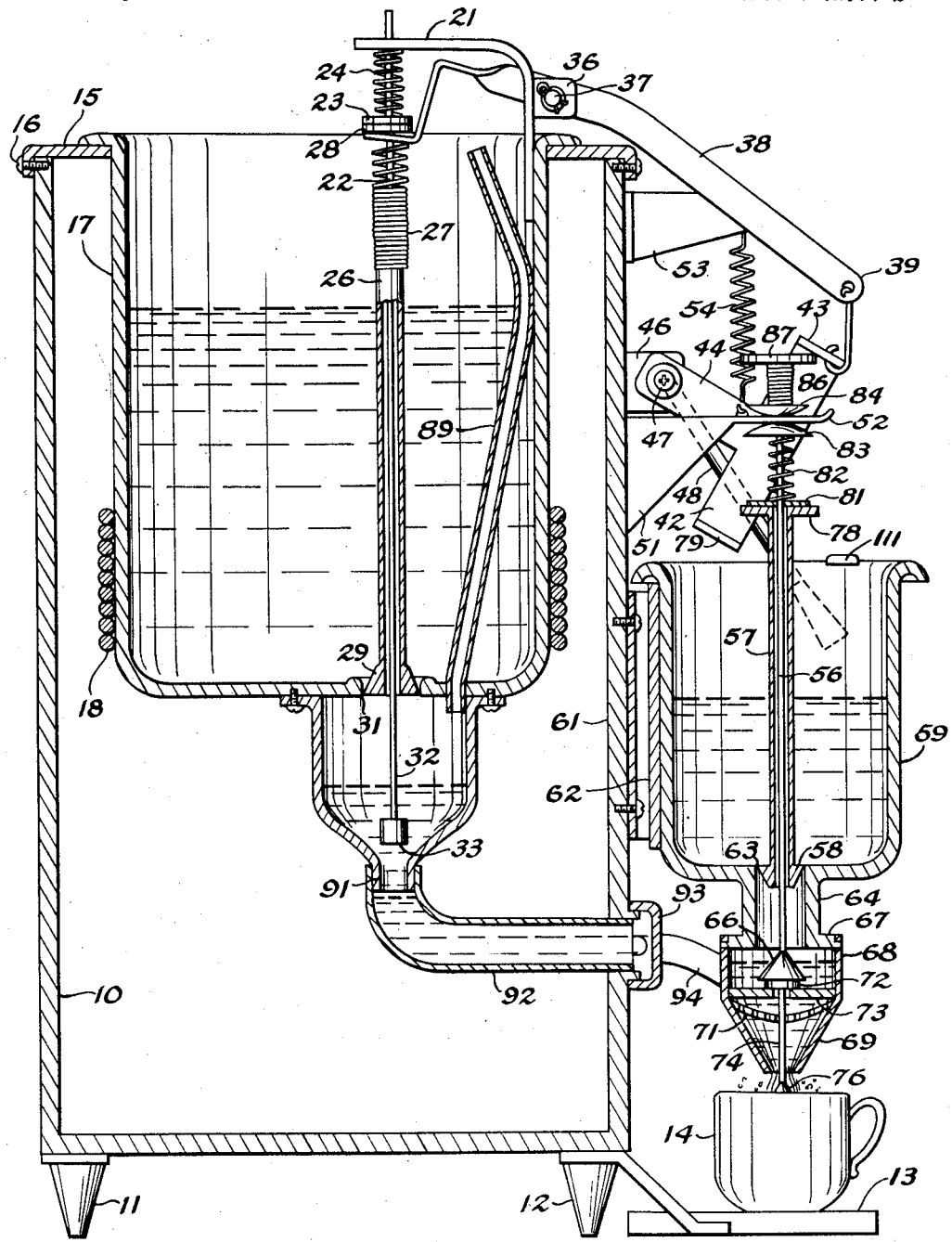

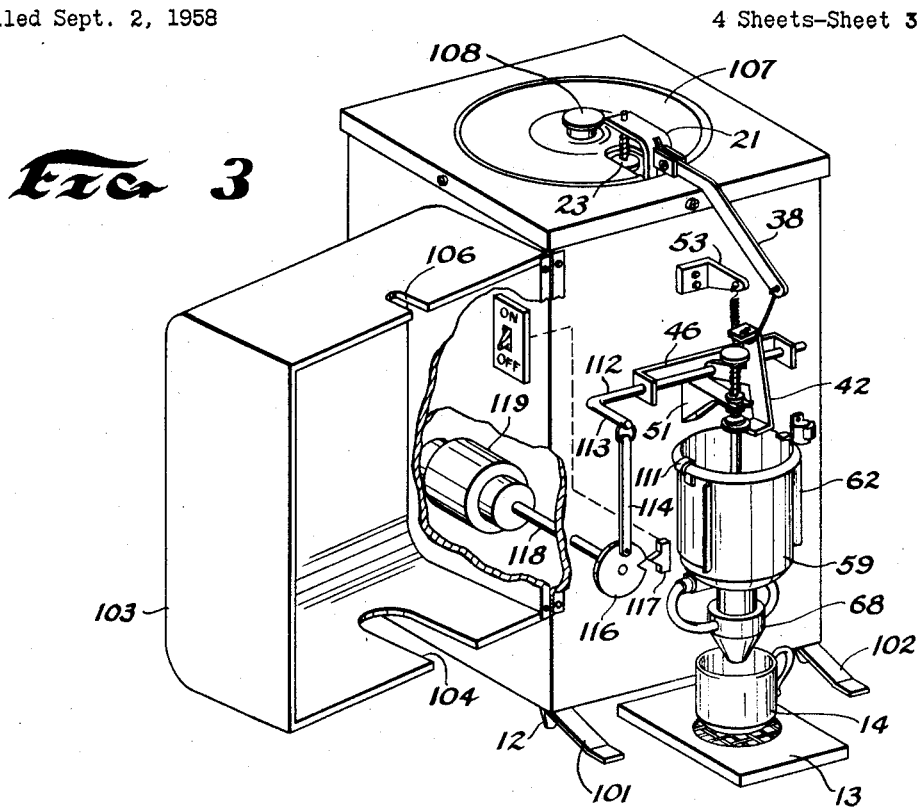
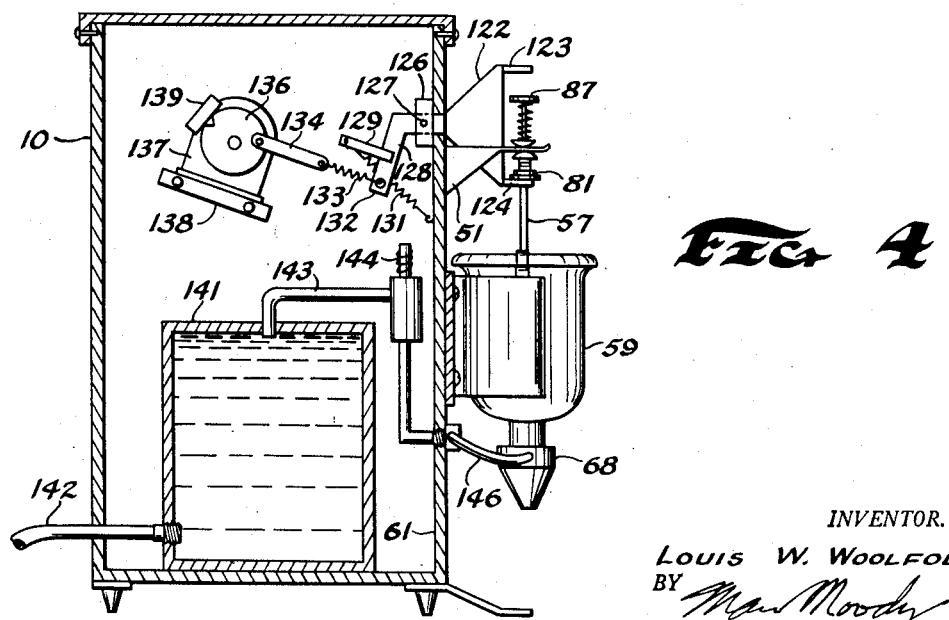

Nov. 10, 1959 L. W. WOOLFOLK 2,912,143
DISPENSING MACHINE
Filed Sept. 2, 1958 4 Sheets-Sheet 4
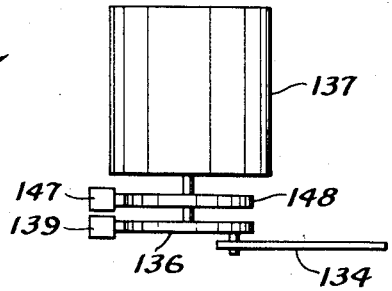
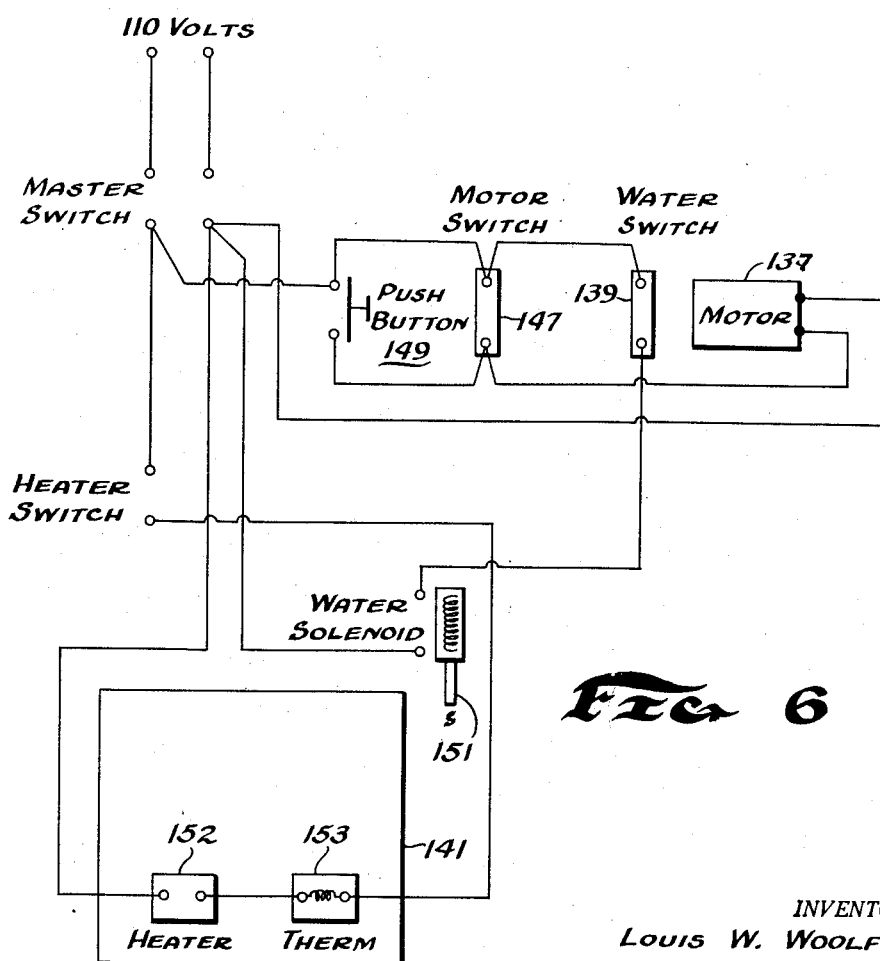
INVENTOR.
LOUIS W. WOOLFOLK
BY
Marvin Moody
ATTORNEY United States Patent Office 2,912,143
Patented Nov. 10, 1959

2,912,143

DISPENSING MACHINE

Louis W. Woolfolk, Cedar Rapids, Iowa

Application September 2, 1958, Serial No. 758,324

9 Claims. (Cl. 222—129.4)

This invention relates in general to dispensing machines and in particular to means for mixing concentrated syrups with liquid.

It is oftentimes desirable to mix concentrates of heavy viscosity with water or other liquids to make a useable product. For example, a thick chocolate syrup when mixed with warm water makes hot chocolate. Also a heavy soup concentrate when mixed with water or milk makes soup.

It is an object of this invention, therefore, to provide an improved mixing machine.

Another object of this invention is to provide a mixing machine with an easily detachable container for a thick concentrate.

Yet another object of this invention is to provide an improved mixing machine capable of quickly mixing a thick syrup and a liquid so as to obtain a uniform product.

A feature of this invention is found in the provision for a liquid container and a syrup container with measuring chambers and double valves which lead to a mixing chamber to obtain a uniform mixture.

Further features, objects and advantages will become apparent from the following description and claims when considered in view of the drawings, in which;

Figure 2 is a sectional view of the machine in the operative position, Figure 3 is a view of a modfication of the invention, Figure 4 is a sectional view of another modification of the invention, Figure 5 is a detailed view of the apparatus shown in Figure 4, and;

Figure 6 is a wiring diagram of the modification shown in Figure 4.

Figure 1:
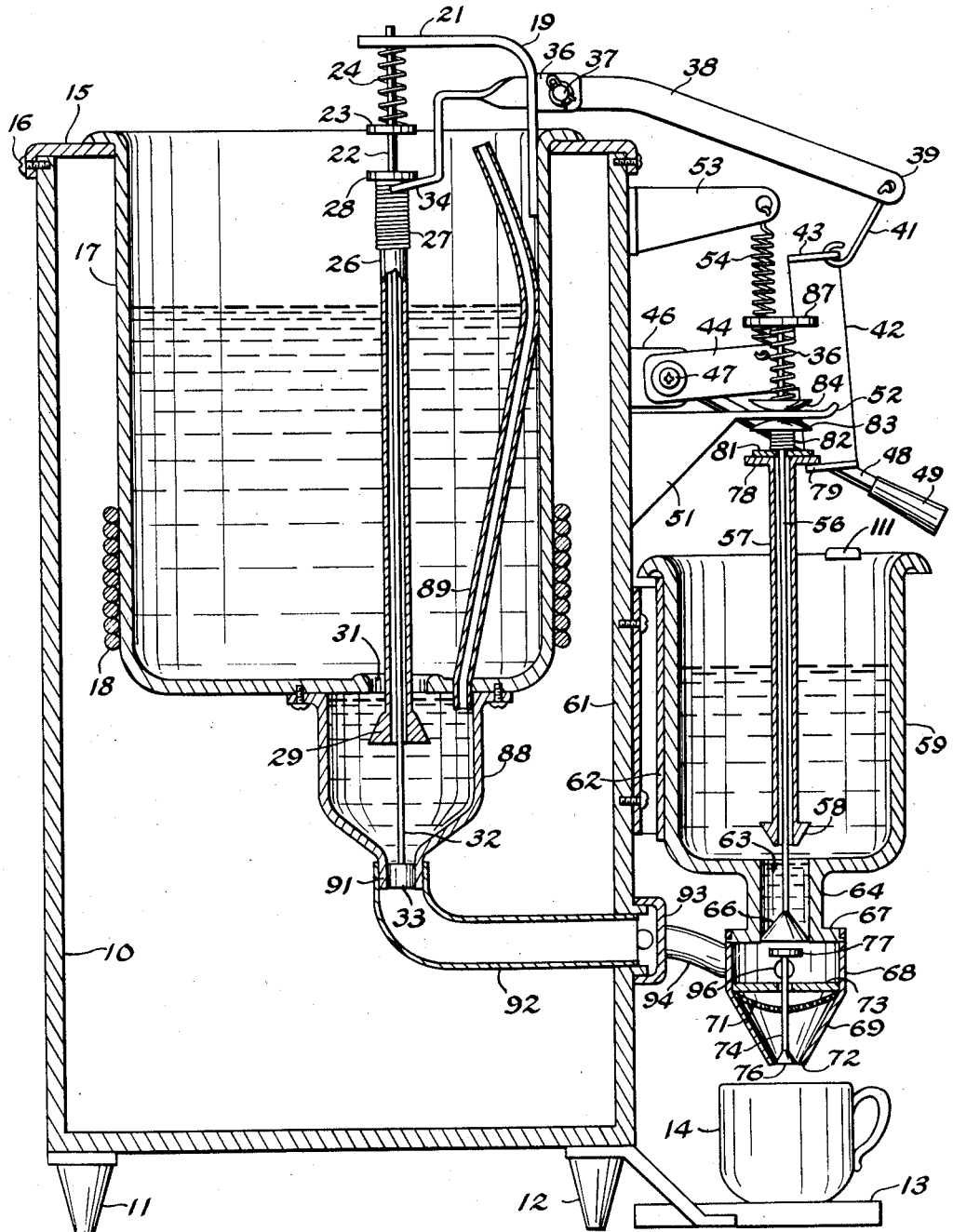
Figure 1 is a sectional view of the mixing machine of this invention in the rest position.

Figures 1 and 2 illustrate the invention. A support member 10 has legs 11 and 12. A cup rest 13 is attached to the bottom of member 10 and a cup 14 sets thereon. A top cover 15 is attached by screws 16 to the member 10.

A first relatively large container 17 fits into member 10 and is supported by cover 15.

A heating element 18 is mounted about container 17 and is connected to a suitable power supply. A thermostat may be connected in series with the heating element to maintain a constant temperature.

An L-shaped bracket 19 is attached to the top of container 17 and has a portion 21 through which shaft 22 extends. A disc 23 is attached to shaft 22 and a spring 24 is mounted between disc 23 and portion 21 about shaft 22.

A hollow sleeve 26 is mounted about shaft 22. A spring 27 has its lower end attached to the top of sleeve 26 and its upper end attached to a washer 28 through which shaft 22 extends.

The sleeve 26 and shaft 22 extend through an opening 31 in the bottom of container 17. The sleeve 26 has a valve 29 that is capable of engaging the opening 31 at certain times, but is normally out of engagement as shown in Figure 1. The lower end 32 of shaft 22 carries a valve 33 which is normally seated in opening 91 of an extension 88 mounted to container 17. An air vent 89 extends from the extension 88 to the top of container 17.

A bracket 46 is attached to the exterior of member 10 and pivotally supports a crank arm 47 which has portion 42 on which is mounted a hand grip.

A T-shaped bracket 44 is locked to the crank arm 47 and has a portion 42 formed with extensions 43 and 79 at either end thereof. A link 41 connects extension 43 to the end 39 of lever 38. The lever 38 is pivotally supported from member 19 by means of a bracket 36 and pin 37. An end 34 of lever 38 fits below disc 28.

A bracket 53 is attached to member 10 and supports a spring 54 which extends between the member 44 and bracket 53 to bias member 44 upwardly.

Another bracket 51 has a bifurcated portion 52 between which is received a shaft 56. A disc 87 is attached to the upper end of shaft 56. A pair of concave discs 83 and 84 are mounted on shaft 56 on either side of portion 52 and a spring 36 is mounted about shaft 56 between discs 87 and 84.

A second container 59 is detachably connected to the wall 61 of member 10 by means of a holder 62. Shaft 56 extends down into an extension 64 formed in container 59 and has a valve 66 which seals the extension when in the position shown in Figure 1.

A hollow shaft 57 fits about shaft 56 and has a disc 78 at its upper end and a valve 58 at its lower end which is capable of sealing the upper end of extension 64 when it engages valve seat 63.

A disc 81 rests against disc 78 and a spring 82 is mounted between discs 81 and 83.

A detachable mixing chamber 68 is attached to a shoulder 67 of the extension 64. A lower portion 69 has an opening 72 into which a no-drip valve 76 seats. A shaft 74 is attached to valve 76 and is supported by a cross member 73 which is formed with an opening. A disc 77 at the top of shaft 74 is engageable with the valve 66 at certain times. A spring, not shown, biases the shaft 74 upwardly.

A screen 71 may be mounted within the mixing chamber 68.

The lower end of extension 88 is coupled by means of a pipe 92, a cap 93 and flexible pipes 94 to the mixing chamber 68 through openings 96.

In operation for use as a hot chocolate machine, for example, water is placed in large container 17 and a chocolate syrup is placed in container 59.

The container 59 may be removed by removing the mixing chamber 68 and pushing the handle 49 down while drawing the container outwardly. This makes it easy to clean and fill container 59. It may be easily mounted by placing it in holder 62 and the discs 83 and 84 on opposite sides of bifurcated member 52. The mixing chamber 68 is then reattached to the container. The spring 36 is strong enough to hold valve 66 closed.

The heating element 18 is plugged into a suitable power source to heat the water in container to a desired temperature. A thermostat may be provided to control the temperature.

When it is desired to make a cup of hot chocolate, a cup is placed as shown in Figure 1 and the handle 49 is depressed to the position shown in Figure 2.

It is to be noted that there is an extension 88 below container 17 and an extension 64 below container 59. Each of these has a valve at the top and bottom and serve to measure the proper quantities of water and syrup. The upper valve 29 in extension 88 is normally open and the lower valve 33 is normally closed thus assuring that extension will be full of water. The air vent 89 allows trapped air to escape.

The upper valve 58 in extension 64 is normally open and valve 66 is normally closed to assure that the extension will be full of syrup.

When the handle 49 is pulled down the valve 29 is closed by the action of member 34 on disc 28 and then valve 33 is opened as spring 24 is compressed to the position shown in Figure 2 to allow the water to run into the mixing chamber 68.

Simultaneously, the member 79 moves downwardly allowing valve 58 to close and member 43 opens valve 66 and "no-drip" 76 by pushing down on disc 87.

Thus, the water and syrup are mixed in chamber 68 and flow into cup 14. When the handle 49 is released it returns to the position shown in Figure 1 and valves 76, 33 and 66 close and valves 29 and 58 open so that the machine is ready for reuse.

Figure 3 illustrates a modification of the apparatus wherein a motor 119 replaces the manual handle. This modification differs from the apparatus shown in Figures 1 and 2 primarily in that the shaft 112 and crank arm 113 replace shaft 47 and arm 48 with handle 49. A link 114 connects crank arm 113 to a cam 116 carried on shaft 118 of motor 119. Cam 116 has an indention which allows a switch 117 to open when adjacent thereto.

A lid 107 with handle 108 covers container 17 with a cut out portion for bracket 21. A cover door 103 with cut outs 106 and 104 may be pivoted to the member 10 to cover the container 59 and other mechanism.

The mechanism of Figure 3 has a switch which is pushed to start operation. This starts motor 119 which causes cam 116 to close switch 117 that is in parallel with the start switch and causes the motor 119 to run one revolution until cam 116 allows switch 117 to open. The start switch is only momentarily closed. The link 114 pulls down on crank arm 113 and closes valves 29 and 58 and opens valves 33, 66 and 76 as in the first embodiment. As motor completes one revolution the apparatus returns to the ready position.

Figures 4, 5 and 6 illustrate another embodiment wherein the container 59 and its valve structure is the same as in embodiments shown in Figures 1, 2 and 3, but wherein the container 17 and its valve structure has been replaced with a pressure tank and a solenoid operated valve to supply a measured quantity of hot water to the mixing chamber. The T-shaped member 42 has been replaced so that most of the linkage is within the container 10.

A motor 137 is mounted on a suitable bracket 138 and carries a pair of cams 136 and 148 (see also Figure 5) on its shaft. The cam 136 operates a cycling switch 139 which causes the motor to turn one revolution before stopping. Cam 148 is the water solenoid control cam and operates switch 147 which controls the solenoid valve.

A link 134 is attached to cam 136 and to a spring 133 which connects to an actuator 128 that is pivotally supported by pin 127 in bracket 126. A portion 122 extends through the member 10 and has tabs 123 and 124 that actuate the valves in container 59.

A lever 129 is connected to member 128 and a spring 131 braces member 128 to the position shown in Figure 4.

As shown in Figure 6 a master switch connects the circuitry to a suitable power supply. A heater switch may normally be closed to allow heater 152 and thermostat 153 to heat water in tank 141 to a desired temperature. Since the master switch and heater switch may be left closed continuously the water will stay heated. A suitable supply pipe 142 keeps tank 141 full of water. The pressure of the incoming line causes water to be discharged when the outlet valve is opened.

A discharge pipe 143 is connected to a valve 144 which allows water to pass through tubes 146 to the mixing chamber 68.

As shown in Figure 6 with the master switch closed, a push button switch 149 when pushed supplies power to motor 137 which causes it to start to rotate. As it starts the motor switch 147 closes and causes the motor to turn for one full revolution. The cam 136 actuates member 122 causing valves 66 and 76 to open in container 59 and valve 58 to close.

Cam 148 actuates switch 147 which causes solenoid 151 of valve 144 to open and supply a measured quantity of water to the mixing chamber 68. The cam 148 is shaped so that the proper amount of water is supplied to the mixing chamber and at the proper time. It is seen that this invention relates to an automatic machine for mixing syrup and liquid.

Although it has been described with respect to preferred embodiments, it is not to be so limited as changes and modifications may be made which are within the full intended scope as defined by the appended claims.

I claim:

1. A dispensing machine comprising a support member, a pair of containers attached to the support member, extensions in the bottom of each container, a first shaft with valve in one end mounted in the first container and extending into the extension thereon to normally seal the lower end, a hollow sleeve mounted about the first shaft and with a valve at its lower end which is movable to make a fluid seal between the first container and the extension, a second shaft with a valve at its lower end mounted within the second container and its extension so that the valve normally seals the lower end of the extension, a hollow shaft mounted about the second shaft and with a valve at its lower end which is movable to seal the upper end of the extension of the second container, and an actuating mechanism connected to the support member and adapted to move the first, second and hollow shaft and hollow sleeve, and a mixing chamber fluidly connected to the extensions.

2. Apparatus according to claim 1 wherein said actuating mechanism comprises, an L-shaped bracket attached to the top of the support member and the upper end of the first shaft received therethrough, a first disc attached to the first shaft below the L-shaped bracket, a first spring mounted between the L-shaped bracket and the first disc to bias it downwardly, a second disc slideably mounted on the first shaft, a second spring connected between the second disc and the upper end of the hollow sleeve, a lever pivotally attached to the support member and formed with an end portion which engages the underside of the second disc, a crank pivotally attached to the support member, a T-shaped bracket attached to the crank, a linkage between said lever and the crank, a third spring biasing said T-shaped bracket upwardly, a third disc attached to the upper end of the second shaft, a first concave disc slidably mounted on the second shaft, a fourth spring mounted between the first concave disc and third disc, a second concave disc slideably mounted on the second shaft below the first concave disc, a fourth disc attached to the top of the hollow shaft, a fifth spring mounted between the fourth disc and the second concave disc, the T-shaped bracket formed with a first portion which is normally engaged with the fourth disc to hold the hollow shaft upwardly so that its valve is unseated, and with a second portion that is movable into engagement with the third disc so as to open the valve on the end of the second shaft, and a bifurcated bracket attached to the support member and extending between the first and second concave discs to prevent them from moving relative to the support member.

3. In apparatus according to claim 2 wherein said mixing chamber is mounted below the second container and which has a no-leak valve which is engageable by the valve on the end of the second shaft to open it.

4. In apparatus according to claim 2 a holder for the second container attached to the support member which allows the second container and valve structures to be removed from the container.

5. Apparatus according to claim 1 wherein said actuating mechanism comprises a motor means mounted to the support member and coupled to the first and second shafts and to the hollow shaft to control the valves associated with said shafts, and a motor control means attached to the motor means.

6. Apparatus according to claim 2 wherein a motor means is attached to the support member, a cam which forms a second crank connected to the motor means, a linkage between the crank and the second crank, and a motor control circuit for the motor means.

7. Apparatus according to claim 6 wherein said motor control circuit comprises a start switch, a hold switch connected in parallel with the start switch, and the hold switch engageable with the cam to control the motor means.

8. A dispensing machine comprising a support member, a first container mounted within the support member, a fluid outlet and inlet connected to the first container, a solenoid valve in the fluid outlet, a second container connected to the support member and formed with an extension at its lower end, a first shaft mounted in the second container and with a valve on its lower end for normally sealing the lower end of the extension, a hollow shaft mounted about the first shaft and formed with a valve which is normally open but which is movable to seal the top of the extension, a motor means mounted on the support member, a first cam mounted on the motor means, a first switch engageable with the first cam and connected to the solenoid valve, means for actuating said first shaft and the hollow shaft, said motor means coupled to said means for actuating said shafts, a motor start switch, and a mixing chamber connected to the extension and the solenoid valve.

9. In apparatus according to claim 8, a heater and thermostat mounted in the first container to maintain the fluid therein at a constant temperature.

References Cited in the file of this patent

UNITED STATES PATENTS

| | | |
|---|---|---|
| 1,288,357 | Wooten | Dec. 17, 1918 |
| 2,601,943 | Torrese | July 1, 1952 |